United States Patent [19]
Phipps

[11] Patent Number: 5,669,175
[45] Date of Patent: Sep. 23, 1997

[54] FISH STRIKE INDICATOR APPARATUS

[76] Inventor: Leroy F. Phipps, 2020 W. 1465 North, St. George, Utah 84770

[21] Appl. No.: 678,237

[22] Filed: Jul. 11, 1996

[51] Int. Cl.$^6$ .................................................. A01K 97/12
[52] U.S. Cl. ............................................................ 43/17
[58] Field of Search .................... 43/17, 43.12; 446/314, 446/315; 116/215, 333, DIG. 33, DIG. 34

[56] References Cited

U.S. PATENT DOCUMENTS

| | | | |
|---|---|---|---|
| 2,601,839 | 6/1952 | Kucewicz | 43/17 |
| 3,023,532 | 3/1962 | Gorenty | 43/17 |
| 4,236,340 | 12/1980 | Cunningham | 43/17 |
| 4,552,318 | 11/1985 | Durham | 43/17 |
| 4,702,031 | 10/1987 | Sousa | 43/17 |
| 4,939,864 | 7/1990 | Bowles | 43/17 |
| 5,077,928 | 1/1992 | Deskevich | 43/17 |
| 5,515,639 | 5/1996 | Phipps | 43/17 |
| 5,586,402 | 12/1996 | Brent et al. | 43/17 |

FOREIGN PATENT DOCUMENTS

| 1162345 | 8/1969 | United Kingdom | 43/17 |
|---|---|---|---|

*Primary Examiner*—Jeanne Elpel

[57] ABSTRACT

A fish strike indicator apparatus, which is used with a fishing line, includes a main body portion which includes a top end, a mid-portion, and a bottom end. The bottom end includes a support groove for receiving a fishing line. A first balance arm is connected to the top end of the main body portion and projects transversely therefrom. The first balance arm includes a first balance groove located at a distal end of the first balance arm. A second balance arm is connected to the top end of the main body portion and projects transversely therefrom in a direction opposite to the first balance arm. The second balance arm includes a second balance groove located at a distal end of the second balance arm. A fallen-indicator receiver can be located under the main body portion to provide an audible signal when a fish strike occurs. In an alternative embodiment, the main body portion can include a balance-arm-supporting portion which supports the first balance arm and the second balance arm and can include a support-groove-rotation assembly connected to a bottom end of the balance-arm-supporting portion. The support-groove-rotation assembly includes a rotatable adjustment member which includes the support groove at a bottom end of the rotatable adjustment member. A screw connects the adjustment member to the balance-arm-supporting portion. A friction element can be connected between the rotatable adjustment member and the balance-arm-supporting portion.

8 Claims, 3 Drawing Sheets

FISH STRIKE INDICATOR APPARATUS

BACKGROUND OF THE INVENTION

1. Field of the Invention

The present invention relates generally to devices for alerting a fisherman that a fish has struck on the fishing line and, more particularly, to a fish strike alert that senses a change of tension in the fishing line due to the fish strike.

2. Description of the Prior Art

There are certain styles of fishing in which a fishing pole remains in a sedentary position or static position during times before a fish strikes at the line. After the fish strikes, the pole flexes, and the fishing line tightens. In such a style of fishing, a fisherman often stands or sits away from the fishing pole until such time as when a fish strikes. When the fisherman is some distance from the fishing pole, it may be difficult for the fisherman to first notice when a strike occurs. Throughout the years, a number of innovations have been developed relating to devices for alerting a fisherman when a fish strike occurs, and the following U.S. patents are representative of some of those innovations: 2,601,839, 4,236,340, 4,552,318, 4,702,031, and 4,939,864. More specifically, each of the patents cited above discloses a fish strike indicator device which is in continuous contact with a fishing line at all times. That is, the cited devices are in contact with the fishing line when the fishing rod is in storage, when the rod is used for casting, when the rod is used for waiting for a fish to strike, and when the rod is used for reeling in a caught fish.

The continuous presence of such a prior art fish strike indicator device may be undesirable when the rod is used for casting. For casting, the fish strike indicator device hay upset the balance of the fishing rod. Moreover, the fish strike indicator device may interfere with the efficient paying out of fishing line during casting. In this respect, it would be desirable if a fish strike indicator device were provided that is not in contact with fishing line during casting.

The continuous presence of a prior art fish strike indicator device described above may be undesirable when the rod is used for reeling in a caught fish. When a fish is caught, the fishing line must be reeled in a controlled and efficient manner. The rod, reel, and fishing line are designed to work together efficiently to accomplish this goal. The presence of a fish strike indicator device in contact with the fishing line even after the fish is caught, may interfere with an efficient reeling in operation. In this respect, it would be desirable if a fish strike indicator device were provided that is not in contact with the fishing line after the fish is caught and when the fish is being reeled in.

Aside from the prior art fish strike indicator devices mentioned above, other devices are known for signalling the occurrence of a fish strike. For example, fish bobbers are known which float in the water. Such bobbers are connected to a fishing line. However, bobbers are affected by both wind and waves, and, as a result, such bobbers often give false signals. In this respect, it would be desirable if a fish strike indicator device which does not give false signals of a fish strike due to the effects of wind and waves on the water.

Sometimes, the moment a fish strike occurs is not observed due to inattention of the fisherman. With some fish strike indicator devices, if the actual moment of the strike is not observed, the fisherman may be unaware of the occurrence of the strike. In this respect, it would be desirable if a fish strike indicator device were provided which gives a fisherman a signal that a fish strike has occurred, even after the time of the occurrence of the fish strike.

When a person is fishing, there are ambient conditions of wind and waves that provide a background to the force that are transmitted through the fishing line to the fishing rod. In this respect, it would be desirable if a fish strike indicator device were provided that can be adjusted for a variety of ambient conditions relating to wind and waves and forces transmitted through a fishing line to a fishing rod.

Still other features would be desirable in a fish strike indicator apparatus. Because a fish strike alert is employed near water, it would be desirable for a fish strike indicator device to be able to float on water if the device inadvertently falls into the water. Aside from providing a visual signal as to the occurrence of a fish strike, it would be desirable if a fish strike indicator device also could provide an audible signal.

Thus, while the foregoing body of prior art indicates it to be well known to use fish strike indicator devices, the prior art described above does not teach or suggest a fish strike indicator apparatus which has the following combination of desirable features: (1) is not in contact with a fishing line during casting; (2) is not in contact with the fishing line after the fish is caught and when the fish is being reeled in; (3) does not readily give false signals of a fish strike due to the effects of wind and waves on the water; (4) gives a fisherman a signal that a fish strike has occurred, even after the time of the occurrence of the fish strike; (5) can be adjusted for a variety of ambient conditions relating to wind and waves and forces transmitted through a fishing line to a fishing rod; (6) is able to float on water if the apparatus inadvertently falls into the water; and (7) can provide an audible signal of a fish strike. The foregoing desired characteristics are provided by the unique fish strike indicator apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a fish strike indicator apparatus, which is used with a fishing line, and which includes a main body portion which includes a top end, a mid-portion, and a bottom end. The bottom end includes support groove means for receiving a fishing line. A first balance arm is connected to the top end of the main body portion and projects transversely therefrom. The first balance arm includes a first balance groove located at a distal end of the first balance arm. A second balance arm is connected to the top end of the main body portion and projects transversely therefrom in a direction opposite to the first balance arm. The second balance arm includes a second balance groove located at a distal end of the second balance arm. A fallen-indicator receiver can be located under the main body portion.

In an alternative embodiment, the main body portion can include a balance-arm-supporting portion which supports the first balance arm and the second balance arm and can include a support-groove-rotation assembly connected to a bottom end of the balance-arm-supporting portion. The first balance arm and the second balance arm can be in a form of an integrated and unified balance arm unit, and the balance-arm-supporting portion includes a receiving channel for receiving the balance arm unit.

The support-groove-rotation assembly includes a rotatable adjustment member which includes the support groove means at a bottom end of the rotatable adjustment member. A connection means, such as a screw, is provided for connecting the adjustment member to the balance-arm-supporting portion. A friction element can be connected between the rotatable adjustment member and the balance-arm-supporting portion. Alternate support groove means can be located at the bottom end of the rotatable adjustment member.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fish strike indicator apparatus which has all of the advantages of the prior art and none of the disadvantages.

It is another object of the present invention to provide a new and improved fish strike indicator apparatus which may be easily and efficiently manufactured and marketed.

It is a further object of the present invention to provide a new and improved fish strike indicator apparatus which is of durable and reliable construction.

An even further object of the present invention is to provide a new and improved fish strike indicator apparatus which is susceptible of a low cost of manufacture with regard to both materials and labor, and which accordingly is then susceptible of low prices of sale to the consuming public, thereby making such fish strike indicator apparatus available to the buying public.

Still yet a further object of the present invention is to provide a new and improved fish strike indicator apparatus which is not in contact with a fishing line during casting.

Still another object of the present invention is to provide a new and improved fish strike indicator apparatus that is not in contact with the fishing line after the fish is caught and when the fish is being reeled in.

Yet another object of the present invention is to provide a new and improved fish strike indicator apparatus which does not readily give false signals of a fish strike due to the effects of wind and waves on the water.

Even another object of the present invention is to provide a new and improved fish strike indicator apparatus that gives a fisherman a signal that a fish strike has occurred, even after the time of the occurrence of the fish strike.

Still a further object of the present invention is to provide a new and improved fish strike indicator apparatus which can be adjusted for a variety of ambient conditions relating to wind and waves and forces transmitted through a fishing line to a fishing rod.

Yet another object of the present invention is to provide a new and improved fish strike indicator apparatus that is able to float on water if the apparatus inadvertently falls into the water.

Still another object of the present invention is to provide a new and improved fish strike indicator apparatus which can provide an audible signal of a fish strike.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved fish strike indicator apparatus embodying the principles and concepts of the present invention will be described.

Figure 1:
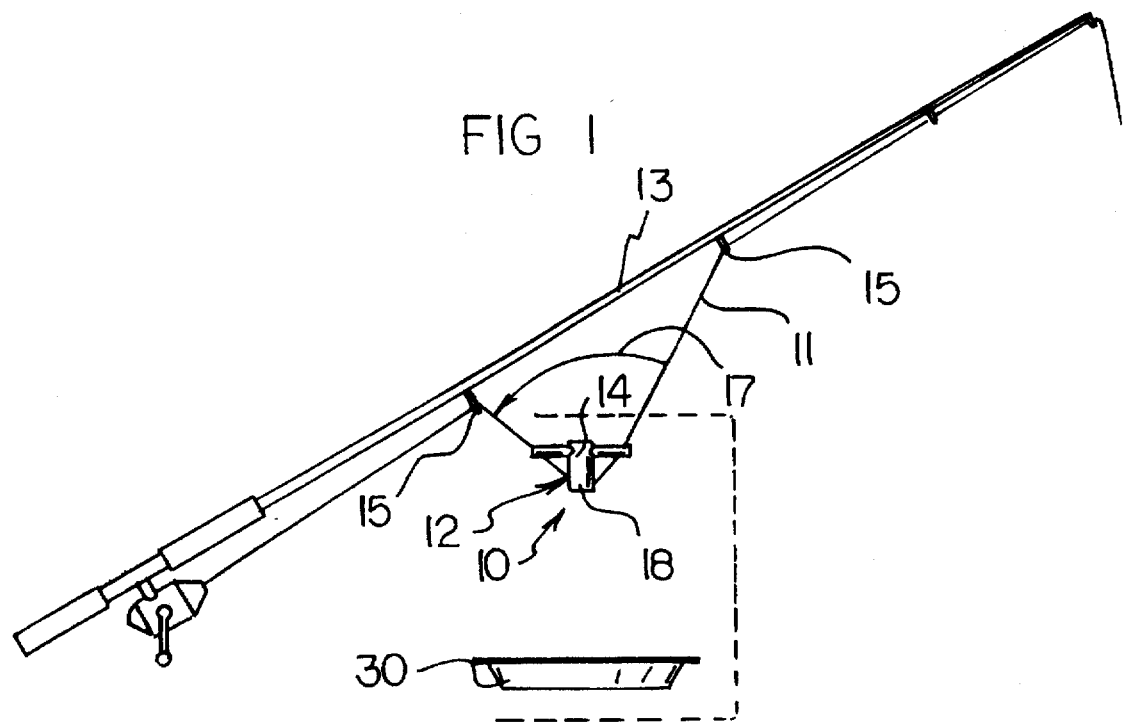
FIG. 1 is a side view showing a first embodiment of the fish strike indicator apparatus of the invention supported by a fishing line which is used with a fishing rod.
Figure 2:
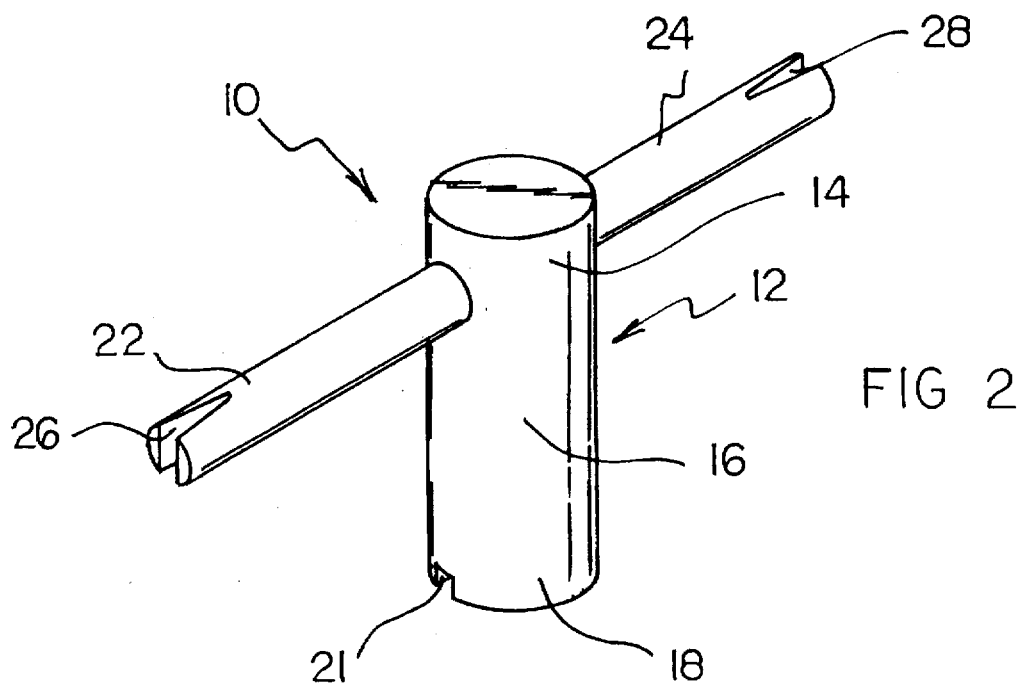
FIG. 2 is an enlarged perspective view of the first embodiment of the fish strike indicator apparatus removed from the fishing line.

Turning to FIGS. 1–2, there is shown a first embodiment of the fish strike indicator apparatus of the invention generally designated by reference numeral 10. In the first embodiment, the fish strike indicator apparatus 10, which is used with a fishing line 11, includes a main body portion 12 which includes a top end 14, a mid-portion 16, and a bottom end 18. The bottom end 18 includes support groove means 21 for receiving a fishing line 11. A first balance arm 22 is connected to the top end 14 of the main body portion 12 and projects transversely therefrom. The first balance arm 22 includes a first balance groove 26 located at a distal end of the first balance arm 22. A second balance arm 24 is connected to the top end 14 of the main body portion 12 and projects transversely therefrom in a direction opposite to the first balance arm 22. The second balance arm 24 includes a second balance groove 28 located at a distal end of the second balance arm 24. A fallen-indicator receiver 30 can be located under the main body portion 12. The fallen-indicator receiver 30 can readily be embodied by a metal pie pan which provides an audible signal when the main body portion 12 falls upon it.

In using the first embodiment of the invention, reference is made to FIG. 1. First, the fishing hook and lure is cast into the water. Then, the fishing rod 13 is secured to a stationary support such as a stand or the ground (not shown). Then, as shown, the fishing line 11 is arranged to have an amount of slack under the fishing rod 13. The mount of slack is indicated by slack angle 17. The slack is created in the fishing line 11 between two ferrules 15 on the fishing rod 13. The support groove means 21 is rested on the slack-containing fishing line 11, and portions of the fishing line 11 are inserted into the first balance groove 26 and the second balance groove 28. In this way, the fish strike indicator apparatus 10 is balanced on the fishing line 11 and is supported by the fishing line I1.

As long as the slack angle 17 is sufficiently small, the fishing line 11 maintains its contact with the first balance groove 26, the second balance groove 28, and the support groove means 21; and the fish strike indicator apparatus 10 of the invention is retained and balanced by the fishing line 11. However, when a fish strikes, the fishing line 11 is made more taut. As a result, a portion of the fishing line 11 is pulled away from the fishing rod 13 toward the fish, and the slack angle 17 is increased. When the slack angle 17 increases sufficiently, the fishing line 11 pulls away from one or both of the first balance groove 26 and the second balance groove 28. Then, the fish strike indicator apparatus 10 loses its balance on the support groove means 21 and the fishing line 11, and the fish strike indicator apparatus 10 falls off of the fishing line 11. The falling off of the fish strike indicator apparatus 10 from the fishing line 11 when a fish strike occurs provides a visual indication of the occurrence of a fish strike. This visual indication of the occurrence of a fish strike (the absence of the fish strike indicator apparatus 10 from the fishing line 11) is present at the moment the fish strike occurs and is also present after the fish strike occurs.

If desired, a fallen-indicator receiver 30 can be placed under the main body portion 12 before a fish strike occurs. After a fish strike occurs, the main body portion 12 and the balance arms fall onto the fallen-indicator receiver 30 making an audible sound which provides an audible indication of the occurrence of the fish strike.

Figure 3:
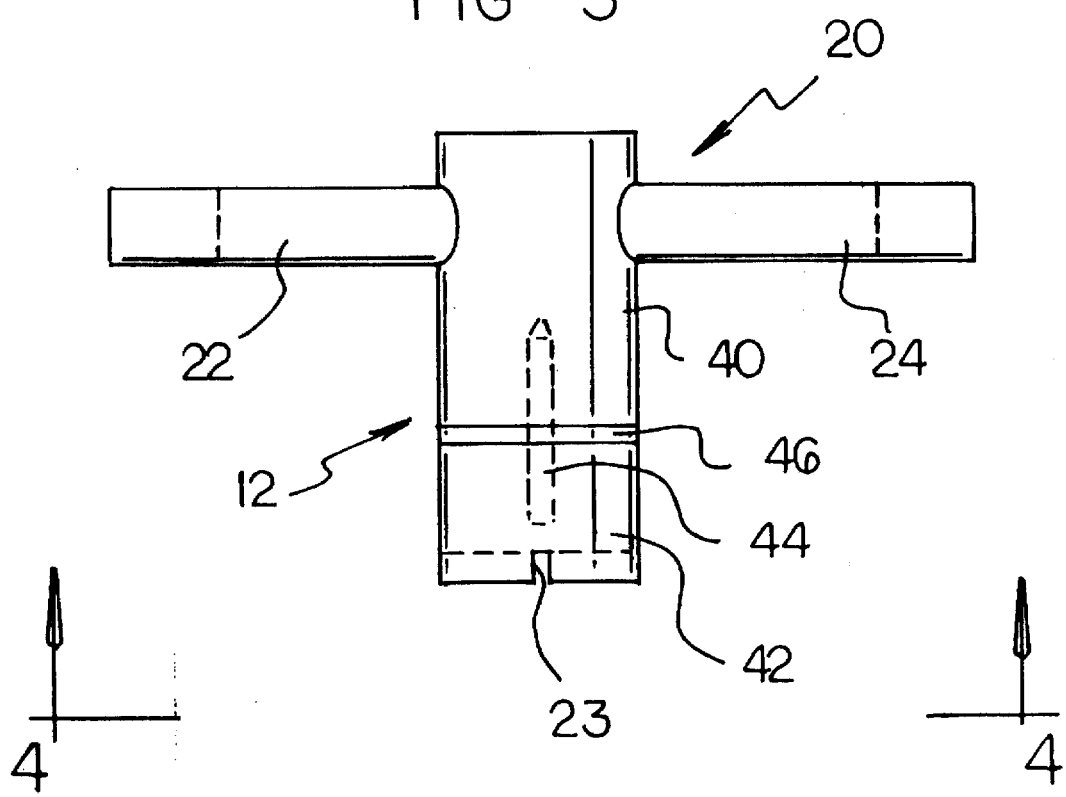
FIG. 3 is a side view of a second embodiment of the fish strike indicator apparatus of the invention.
Figure 4:
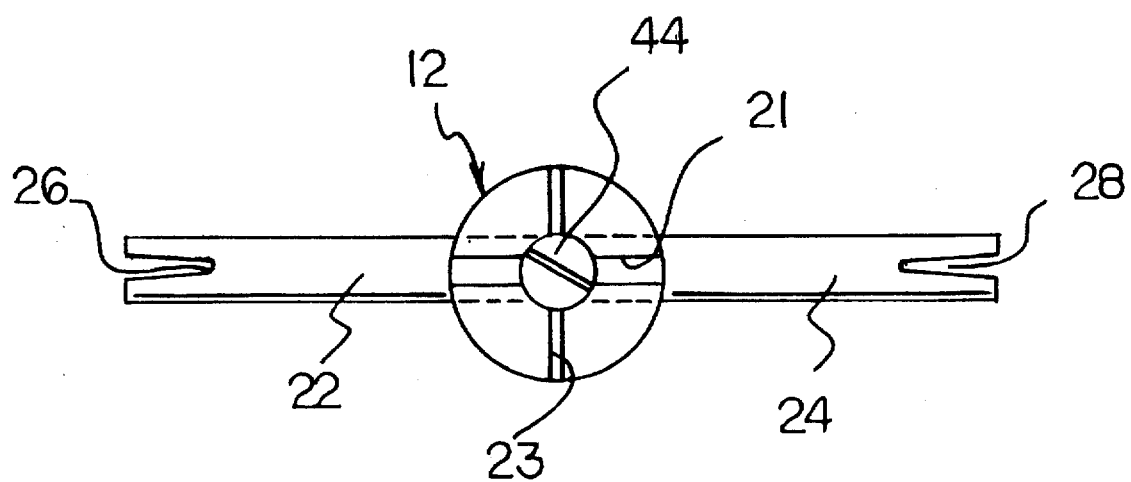
FIG. 4 is a bottom view of the embodiment of the invention shown in FIG. 3 taken along line 4—4 thereof.
Figure 5:
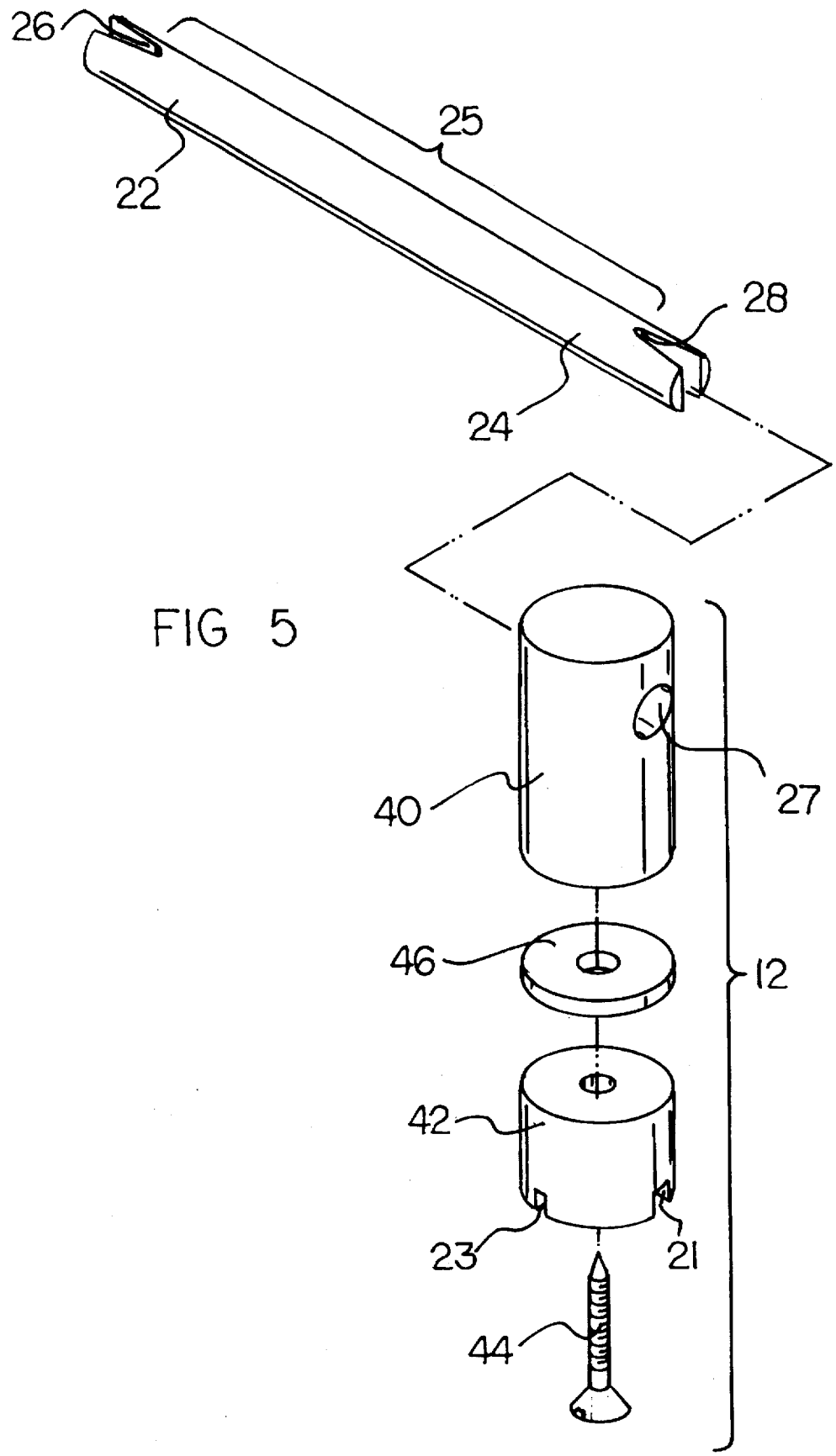
FIG. 5 is an exploded perspective view of the embodiment of the invention shown in FIGS. 3 and 4.

Turning to FIGS. 3–5, a second embodiment 20 of the fish strike indicator apparatus invention is shown. Reference numerals are shown that correspond to like reference numerals that designate like elements shown in the other figures. In addition, the main body portion 12 includes a balance-arm-supporting portion 40 which supports the first balance arm 22 and the second balance arm 24 and includes a support-groove-rotation assembly connected to a bottom end of the balance-arm-supporting portion 40. The first balance arm 22 and the second balance arm 24 are in a form of an integrated and unified balance arm unit 25, and the balance-arm-supporting portion 40 includes a receiving channel 27 for receiving the balance arm unit 25.

The support-groove-rotation assembly includes a rotatable adjustment member 42 which includes the support groove means 21 at a bottom end of the rotatable adjustment member 42. A connection means is provided for connecting the adjustment member 42 to the balance-arm-supporting portion 40. As shown in the drawings, the connection means can be a screw 44.

A friction element 46 is connected between the rotatable adjustment member 42 and the balance-arm-supporting portion 40. The friction element 46 can be in the form of a rubber washer 46. Alternate support groove means 23 can be located at the bottom end of the rotatable adjustment member 42.

To use the second embodiment 20 of the fish strike indicator apparatus of the invention, the second embodiment 20 is used in substantially the same way as the first embodiment of the fish strike indicator apparatus 10 described above. In addition, the second embodiment 20 provides a way of applying a rotational tension on the fishing line 11 when the second embodiment 20 of the invention is employed. More specifically, the fishing line 11 is fitted into the first balance groove 26, the second balance groove 28, and the support groove means 21 as described for the first embodiment of the invention. Then, the balance-arm-supporting portion 40 is grasped in one hand of a person, and the rotatable adjustment member 42 is grasped in the other hand of the person. The person then rotates the rotatable adjustment member 42 around the balance-arm-supporting portion 40 for only a small fraction of a single rotation, for example 10 degrees. When this is done, a rotational tension is applied to the fishing line 11 between the first and second balance grooves 26, 28 and the support groove means 21. Friction between the balance-arm-supporting portion 40 and the rotatable adjustment member 42 locks the fishing line 11 in the desired rotational tension. The rotational tension in the fishing line 11 helps stabilize the second embodiment 20 of the invention on the fishing line 11 and helps prevent the second embodiment 20 of the invention from falling off of the fishing line 11 in the event of a strong wind prior to the occurrence of a fish strike.

The fishing-line-tension-locking frictional forces between the balance-arm-supporting portion 40 and the rotatable adjustment member 42 are determined in part by the friction element 46 and in part by the pressure exerted by the rotatable adjustment member 42 on the balance-arm-supporting portion 40 by way of the friction element 46. The screw 44 has threads which engage complementary threads in the balance-arm-supporting portion 40. The threaded portion of the screw 44 passes through a screw-reception channel in the rotatable adjustment member 42. When the screw 44 is tightened, the friction element 46 is sandwiched tightly between the balance-arm-supporting portion 40 and the rotatable adjustment member 42, whereby a relatively strong torque force is needed to overcome the frictional forces between the balance-arm-supporting portion 40, the friction element 46, and the rotatable adjustment member 42. On the other hand, when the screw 44 is loosened, the friction element 46 is sandwiched less tightly between the balance-arm-supporting portion 40 and the rotatable adjustment member 42, whereby a weaker torque force is needed to overcome the frictional forces between the balance-arm-supporting portion 40, the friction element 46, and the rotatable adjustment member 42.

If desired, instead of using the support groove means 21, with the rotatable adjustment member 42, the alternate support groove means 23 can be employed for receiving the fishing line 11 for supporting the second embodiment 20 of the fish strike indicator apparatus of the invention on the fishing line 11. The width of the alternate support groove means 23 can be different from the width of the support groove means 21 to accommodate fishing lines 11 of different thickness.

In producing either the first or the second embodiment of the invention, the distance between the tips of the balance arms to the vertical distance from the balance arms to the support groove should be in an approximate ratio of 4 to 1. Increasing the ratio above 4 to 1 will decrease sensitivity and require less line slack. On the other hand, decreasing the ratio below 4 to 1 increases sensitivity but requires more line slack.

Further considerations are to provide structural components in cylindrical form. The cylindrical form minimizes the effect of wind. Slots at the ends of the balance arms should be sufficiently deep (approximately one-half inch) and sufficiently wide (approximately one-eighth inch) to allow for unimpeded slippage of fish line onto and within the slob and wider at the opening to facilitate mounting an embodiment of the invention on the fishing line.

The balance arm slots and the support groove on the main body unit are preferably co-planar and at right angles to each other. Instead of using a rubber washer as a friction element 46, a helical spring can be used as an alternative.

The components of the fish strike indicator apparatus of the invention can be made from inexpensive and durable wooden and plastic materials. Preferably, the fish strike indicator apparatus of the invention will float if dropped into water.

As to the manner of usage and operation of the instant invention, the same is apparent from the above disclosure, and accordingly, no farther discussion relative to the manner of usage and operation need be provided.

It is apparent from the above that the present invention accomplishes all of the objects set forth by providing a new and improved fish strike indicator apparatus that is low in cost, relatively simple in design and operation, and which may advantageously be used without being in contact with a fishing line during casting. With the invention, a fish strike indicator apparatus is provided which is not in contact with the fishing line after the fish is caught and when the fish is being reeled in. With the invention, a fish strike indicator apparatus is provided which does not readily give false signals of a fish strike due to the effects of wind and waves on the water. With the invention, a fish strike indicator apparatus is provided which gives a fisherman a signal that a fish strike has occurred, even after the time of the occurrence of the fish strike. With the invention, a fish strike indicator apparatus is provided which can be adjusted for a variety of ambient conditions relating to wind and waves and forces transmitted through a fishing line to a fishing rod. With the invention, a fish strike indicator apparatus is provided which is able to float on water if the apparatus inadvertently falls into the water. With the invention, a fish strike indicator apparatus is provided which can provide an audible signal of a fish strike.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A fish strike indicator apparatus for use with a fishing line, comprising:

a main body portion which includes a top end, a mid-portion, and a bottom end, wherein said bottom end includes support groove means for receiving a fishing line, a first balance arm connected to said top end of said main body portion and projecting transversely therefrom, wherein said first balance arm includes a first balance groove located at a distal end of said first balance arm, and a second balance arm connected to said top end of said main body portion and projecting transversely therefrom in a direction opposite to said first balance arm, wherein said second balance arm includes a second balance groove located at a distal end of said second balance arm.

2. The apparatus of claim 1, further including:

a fallen-indicator receiver located under said main body portion.

3. The apparatus of claim 1 wherein said main body portion includes:

a balance-arm-supporting portion which supports said first balance arm and said second balance arm, and a support-groove-rotation assembly connected to a bottom end of said balance-arm-supporting portion.

4. The apparatus of claim 3 wherein:

said first balance arm and said second balance arm are in a form of an integrated and unified balance arm unit, and said balance-arm-supporting portion includes a receiving channel for receiving said balance arm unit.

5. The apparatus of claim 3 wherein said support-groove-rotation assembly includes:

a rotatable adjustment member which includes said support groove means at a bottom end of said rotatable adjustment member, and connection means for connecting said adjustment member to said balance-arm-supporting portion.

6. The apparatus of claim 5 wherein said connection means is a screw.

7. The apparatus of claim 5, further including:

a friction element connected between said rotatable adjustment member and said balance-arm-supporting portion.

8. The apparatus of claim 5, further including:

alternate support groove means located at said bottom end of said rotatable adjustment member.

* * * * *